(12) United States Patent
Larose

(10) Patent No.: US 11,897,798 B2
(45) Date of Patent: *Feb. 13, 2024

(54) CHILLER WATER SAMPLING DEVICE

(71) Applicant: BIOSAFE SYSTEMS LLC, East Hartford, CT (US)

(72) Inventor: Robert Larose, East Hartford, CT (US)

(73) Assignee: BioSafe Systems LLC, East Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,935

(22) Filed: Nov. 22, 2021

(65) Prior Publication Data

US 2022/0081335 A1    Mar. 17, 2022

Related U.S. Application Data

(63) Continuation of application No. 16/762,640, filed as application No. PCT/US2018/060889 on Nov. 14, 2018, now Pat. No. 11,192,809.

(60) Provisional application No. 62/585,639, filed on Nov. 14, 2017.

(51) Int. Cl.
| | |
|---|---|
| *C02F 1/72* | (2023.01) |
| *A23B 4/06* | (2006.01) |
| *C02F 1/66* | (2023.01) |
| *G01N 1/20* | (2006.01) |

(Continued)

(52) U.S. Cl.
CPC ............ *C02F 1/722* (2013.01); *A23B 4/06* (2013.01); *A23B 4/20* (2013.01); *C02F 1/66* (2013.01); *G01N 1/2035* (2013.01); *C02F 2103/023* (2013.01); *C02F 2209/003* (2013.01); *C02F 2209/06* (2013.01); *C02F 2209/40* (2013.01); *G01N 2001/205* (2013.01)

(58) Field of Classification Search
CPC ...... C02F 1/722; C02F 1/66; C02F 2103/023; C02F 2209/003; C02F 2209/06; C02F 2209/40; C02F 2209/005; C02F 2303/04; C02F 1/001; C02F 1/008; C02F 1/50; C02F 1/685; C02F 1/686; A23B 4/06; A23B 4/20; A23B 4/062; A23B 4/08; A23B 4/12; A23B 4/18; A23B 4/26; A23B 4/28; G01N 1/2035; G01N 2001/205; G01N 1/00; G01N 1/18; G01N 1/10; G01N 33/00; G01N 2001/2064; G01N 2035/00475; G01N 2035/00584; A23L 3/3508; A23L 2/186; A01N 31/00; A01N 31/02; A01N 37/06; A01N 37/16; C07C 409/26; C01D 3/3945; B01L 2200/06

See application file for complete search history.

(56) References Cited

U.S. PATENT DOCUMENTS

| | | |
|---|---|---|
| 3,240,026 A | 3/1966 | Dolah et al. |
| 4,790,943 A | 12/1988 | Dunn et al. |
| 4,849,237 A | 7/1989 | Hurst |
| (Continued) | | |

*Primary Examiner* — Joseph W Drodge
(74) *Attorney, Agent, or Firm* — PAUL & PAUL

(57) ABSTRACT

A chiller water sampling device includes a pair of flow meters and a proportional valve to provide a constant flow rate of sample water containing peroxyacetic acid from a chiller to a mixing tank. Acid can be added to reduce the pH of sample water in the mixing tank to bring the pH within the operating range of a peroxyacetic acid sensor. The sensed level of peroxyacetic acid can be used to control further addition of peroxyacetic acid to the chiller.

15 Claims, 2 Drawing Sheets

(51) Int. Cl.
    *A23B 4/20*     (2006.01)
    *C02F 103/02*     (2006.01)

(56) References Cited

U.S. PATENT DOCUMENTS

| | | |
|---|---|---|
| 5,683,724 A | 11/1997 | Hei et al. |
| 6,083,463 A | 7/2000 | Dobbs et al. |
| 6,865,895 B2 | 3/2005 | Bass |
| 7,281,384 B2 | 10/2007 | Morris, III et al. |
| 9,271,509 B2 | 3/2016 | Estes et al. |
| 9,414,609 B1 | 8/2016 | Bullard et al. |
| 10,081,784 B2 | 9/2018 | Del Negro et al. |
| 10,974,211 B1 | 4/2021 | Beason et al. |
| 11,192,809 B2 * | 12/2021 | Larose ................. A23B 4/06 |
| 11,350,640 B1 * | 6/2022 | Bullard ............... A23L 3/3508 |
| 2002/0134317 A1 | 9/2002 | Shane et al. |
| 2003/0094422 A1 | 5/2003 | Perkins et al. |
| 2004/0109788 A1 | 6/2004 | Li et al. |
| 2008/0305553 A1 | 12/2008 | Kraus |
| 2009/0043123 A1 | 2/2009 | Copenhafer et al. |
| 2009/0208616 A1 | 8/2009 | Perkins |
| 2011/0247655 A1 * | 10/2011 | Lewis .................. A23L 3/3508 |
| | | 134/25.3 |
| 2013/0327718 A1 | 12/2013 | Adami et al. |
| 2014/0360935 A1 * | 12/2014 | Meier .................... B63J 4/002 |
| | | 210/85 |
| 2016/0068417 A1 | 3/2016 | Buschmann |
| 2017/0107138 A1 | 4/2017 | McLaine |
| 2017/0158537 A1 | 6/2017 | Buschmann |
| 2017/0327775 A1 * | 11/2017 | Del Negro ........... C11D 3/3945 |
| 2018/0042231 A1 * | 2/2018 | Del Negro ............. B01J 14/00 |

* cited by examiner

CHILLER WATER SAMPLING DEVICE

CROSS-REFERENCE TO RELATED APPLICATIONS

The present application is a continuation of U.S. patent application Ser. No. 16/762,640, filed May 8, 2020 now U.S. Pat. No. 11,192,809, issued Dec. 7, 2021, which is a 371 national phase of International Application PCT/US2018/060889, filed Nov. 14, 2018, which claims the priority of U.S. Provisional Application No. 62/585,639, filed Nov. 14, 2017, all of which applications are incorporated by reference in their entireties herein.

BACKGROUND OF THE INVENTION

1. Field of the Invention

The present invention relates to devices for monitoring the level of biocide in poultry plant chillers.

2. Brief Description of the Prior Art

Peroxyacetic acid is employed in food chillers, such as auger and drag type poultry chillers, which are employed in processing plants to reduce the temperature of birds which have been defeathered, eviscerated and are otherwise ready for packaging. Poultry chillers are described, for example, in U.S. Pat. Nos. 3,240,026; 7,281,384; 6,865,895; 9,271,509; all incorporated herein by reference. Various methods have been employed to reduce microbial activity in chiller water, which is typically recirculated and cooled during recirculation. For example, U.S. Pat. No. 4,849,237 discloses sanitizing poultry carcasses using ozonated water at low temperatures. U.S. Patent Publication 2009/0208616 A1 discloses a multistage process for treating poultry processing water with chlorine and ozone. Peroxycarboxylic acids have been used to reduce microbial activity in poultry processing. For example, U.S. Pat. No. 5,683,724 describes a process for inhibiting microbial growth in aqueous food process streams using a percarboxylated acid, such as peracetic acid. U.S. Pat. No. 9,414,609 discloses treating poultry carcasses with an equilibrium solution of peroxyacetic acid at an elevated temperature prior to chilling. Peroxyacetic acid can be provided in the form of an equilibrium solution, or a nonequilibrium solution, such as disclosed, for example, in U.S. Pat. No. 10,081,784.

When peroxyacetic acid is used as an antimicrobial agent in poultry chillers, there is a need to accurately assess the level of peroxyacetic acid to ensure efficacious results.

SUMMARY OF THE INVENTION

The present invention relates to a chiller water sampling device. The device includes a first line for fluid communication with a chiller, such that an aqueous sample can be delivered from the chiller to the device. The device also includes a first flow meter for sensing fluid flow through the first line; a diverter in fluid communication with the first line for dividing the fluid flow from the first line into a second line and a third line; a second flow meter for sensing fluid flow through the second line; and a first valve for controlling fluid flow through the second line such that fluid flow from the device can be discharged through the second line.

The device also includes a second valve for controlling fluid flow through the third line and a mixing tank for receiving fluid flow from the third line, as well as an acid storage tank in fluid communication with the mixing tank, and a first metering device for controlling fluid flow from the acid storage tank to the mixing tank. A first pH sensing device for monitoring the pH of fluid in the mixing tank is also provided. The first pH sensing device generates a first signal responsive to the pH of the fluid in the mixing tank, the first signal being applied to the first metering device for controlling fluid flow from the acid storage tank to the mixing tank. A fourth line for discharging fluid from the mixing tank is also provided.

Further, a second pH sensing device for monitoring the pH of fluid flowing in the fourth line is provided, as well as a fifth line in fluid communication with the fourth line for discharging fluid from the device, and a third valve for controlling fluid flow through the fourth line. A sixth line in fluid communication with the fourth line for discharging fluid from the device is also provided, as well as a fourth valve for controlling fluid flow through the sixth line. The second pH sensing device generates a second signal for controlling operation of the fourth valve and a third signal for controlling operation of the fourth valve.

In addition, a first PAA sensing device for sensing the concentration of peroxyacetic acid in fluid flowing in the sixth line is provided, the first PAA sensing device has an operating range, and provides a signal in response to the concentration of sensed concentration of peroxyacetic acid signal.

Preferably, the device further comprises a filter in the third line for filtering non-fluid material from fluid flowing from the diverter to the second valve.

Preferably, the device further includes a seventh line for providing fluid flow to the third line, fluid flow through the seventh line being controlled by a fifth valve, the seventh line being in fluid communication with the third line between the diverter and the second valve.

Preferably, the device also includes an overflow line, the overflow line being in fluid communication with the mixing tank for discharging fluid from the device, the overflow line being positioned on the mixing tank above a predetermined fluid level in the mixing tank.

Preferably, the device also includes a second PAA sensing device for sensing the concentration of peroxyacetic acid in the sixth line.

Preferably, the device further includes an eighth line for providing fluid flow to the sixth line, the fluid flow in the eighth line being controlled by a sixth valve, the eighth line being in fluid communication with the sixth line between the fourth valve and the first PAA sensing device. Wash water can be provided through the eighth line.

Preferably, the first flow meter generates a first flow control signal, the second flow meter generates a second flow control signal, and the first valve is a proportional valve. Preferably, the device further includes a controller for comparing the first signal and the second signal, and for generating a control signal for the proportional valve, such that the flow through the third line is maintained at a predetermined flow rate.

The present invention also provides a system for controlling the concentration of peroxyacetic acid in the contents of a chiller, the system comprising the chiller water sampling device, a source of peroxyacetic acid, a metering pump for delivering peroxyacetic acid to the chiller, and a controller for the metering pump, the controller for the metering pump being controlled by a signal from the first PAA sensing device.

Preferably, the system further comprises a unit for controlling the pH of the contents of the chiller, the unit comprising a delivery line in fluid communication with the chiller, a pH sensing device for sensing the pH of fluid in the delivery line, and a flow meter for sensing the rate of flow of fluid in the delivery line.

Preferably, in the system fluid output from the delivery line is input to the first line of the device.

Preferably, the system further comprises an alkali storage tank for storing an alkaline fluid, an alkali controller, and an alkali feed pump for delivering the alkaline fluid to the chiller, the alkali controller receiving a signal from the pH sensing device and activating the alkali feed pump when the signal from the pH sensing device meets a predetermined condition.

In one embodiment of the system of the present invention, the source of peroxyacetic acid provides equilibrium peroxyacetic acid. In another embodiment, the source of peroxyacetic acid provides nonequilibrium peroxyacetic acid.

The present invention also provides a process for controlling the concentration of peroxyacetic acid in a chiller employing the chiller water sampling device. The process includes providing a continuous sample of aqueous alkaline fluid from a chiller to the first line, controlling the first valve to provide a predetermined constant flow rate of the sample to the mixing tank, mixing the aqueous fluid provided to the mixing tank, monitoring the pH of the aqueous fluid in the mixing tank, and adding acid to the aqueous fluid in the mixing tank to reduce the pH of the aqueous fluid in the mixing tank, monitoring the pH of the aqueous fluid in the fourth line, delivering aqueous fluid in the fourth line to the sixth line when the monitored pH of the aqueous fluid in the fourth line is within the working range of the first PAA sensing device; and delivering peroxyacetic acid to the chiller in response to the signal from the third sensing device.

Preferably, the process further includes providing a second PAA sensing device for sensing the concentration of peroxyacetic acid in the sixth line, the second sensing device providing a second signal in response to the concentration of sensed concentration of peroxyacetic acid signal, and comparing the signals of the first and second PAA sensing devices.

DETAILED DESCRIPTION

The present invention provides a chiller water sampling device for assessing the level of peroxyacetic acid in the water of a poultry chiller, and a system employing the device for controlling the concentration of peroxyacetic acid in the chiller water, as well as a method for controlling the concentration of peroxyacetic acid in the chiller water.

As used in this specification and claims, "PAA" means peroxyacetic acid (also referred to as "peracetic acid").

Figure 1:
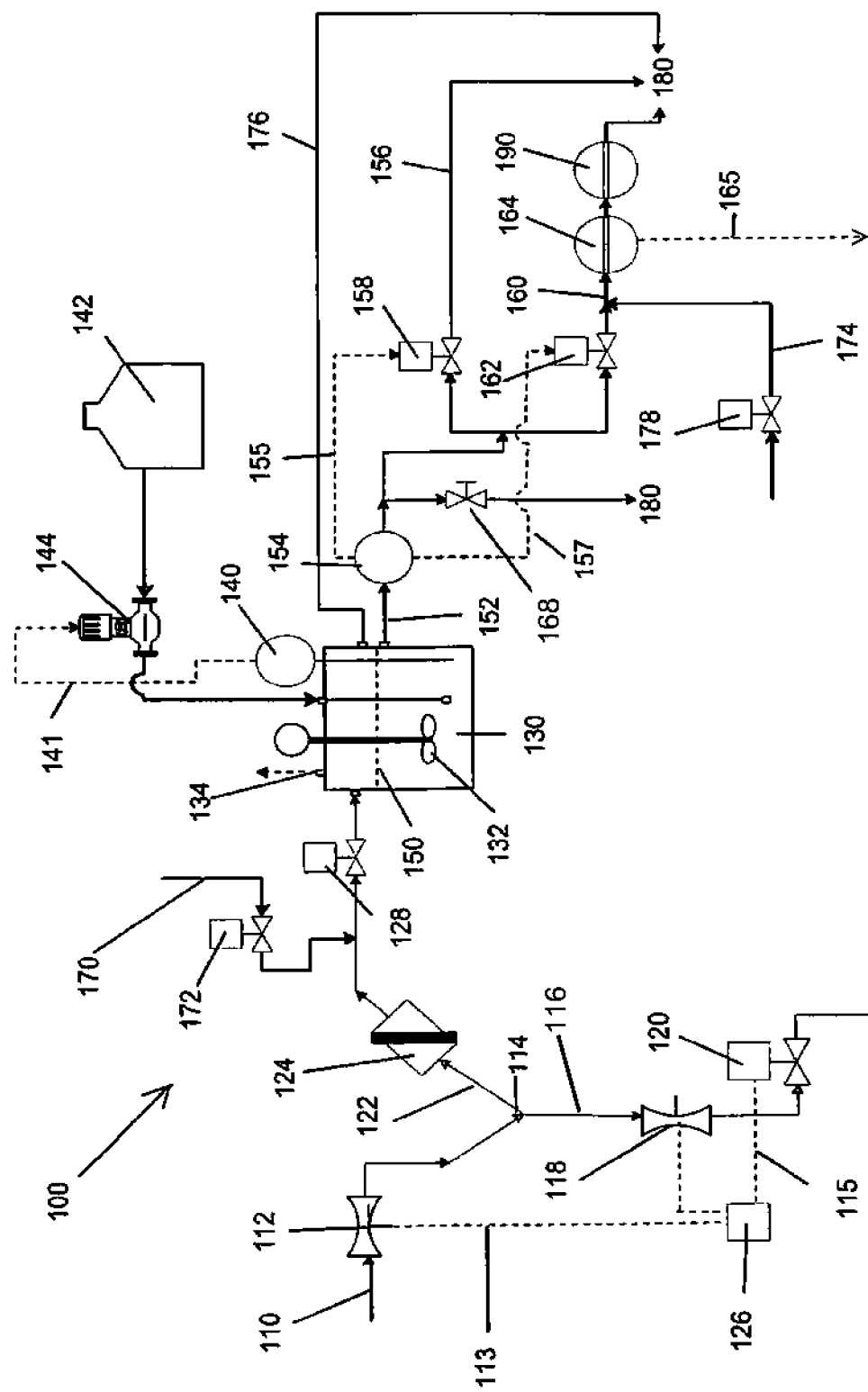
FIG. 1 is a schematic illustration of a chiller water sampling device according to the present invention.
Figure 2:
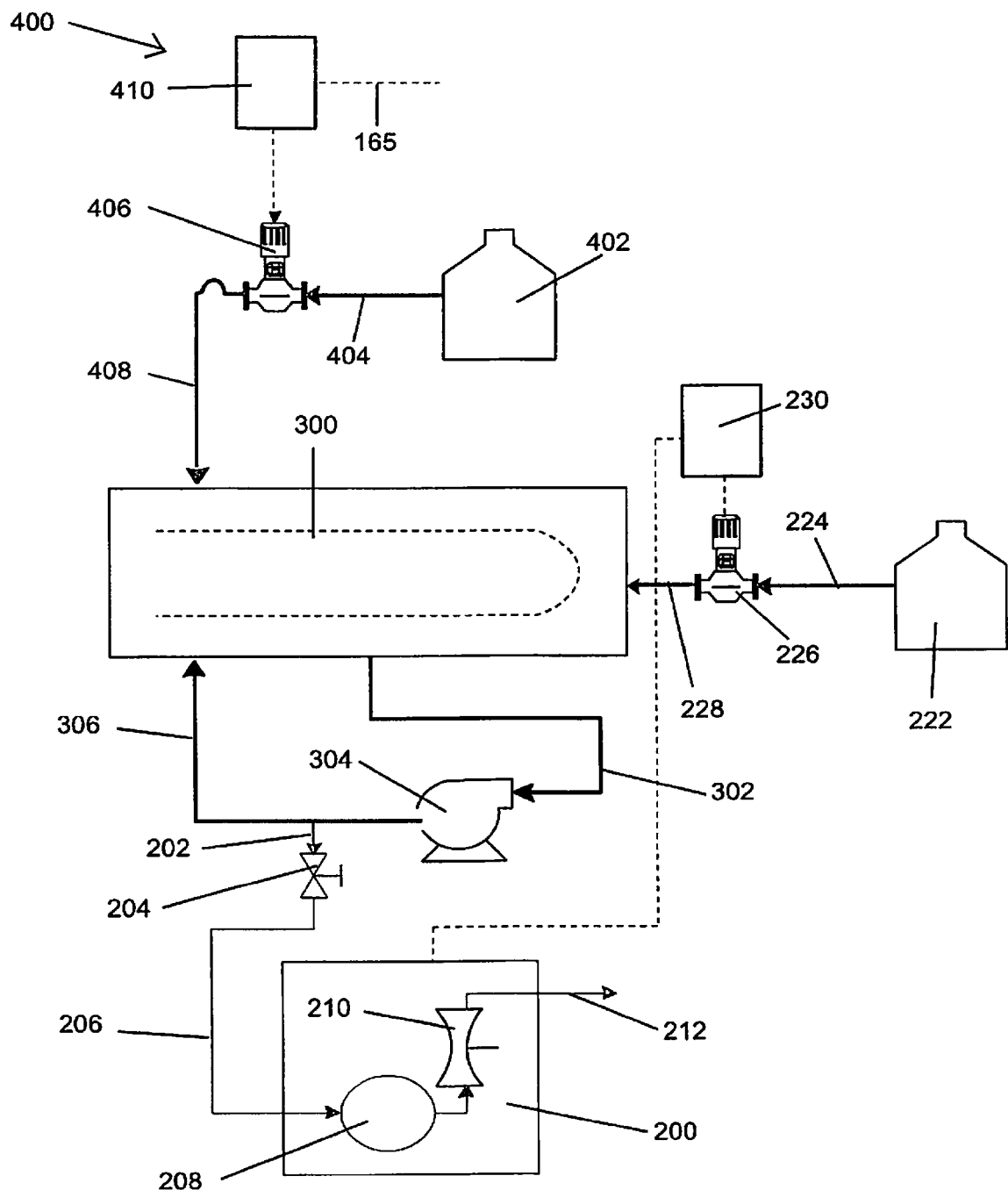
FIG. 2 is a schematic illustration of a system for controlling the concentration of peroxyacetic acid in the contents of a chiller employing the device of FIG. 1.

Referring to FIGS. 1 and 2, wherein like reference numerals refer to like elements throughout the several views, the chiller water sampling device 100 of the present invention includes a first line 110 for fluid communication with a chiller 300 (FIG. 2). A stream of chiller water initially flows through a first flow meter 112 for sensing fluid flow through the first line 110. The first flow meter 112 generates a responsive signal over a first flow control line 113. At the end of the first line 110 a diverter 114 such as a "Y"-fitting, and in fluid communication with the first line 110, is provided to split the stream of chiller water into two streams, one of which flows into a second line 116, and a third line 122. Preferably, the "Y"-fitting permits large contaminant particles in the chiller water to flow downwards through the second line 116. There are fluctuations in the fluid flow through the first line 110, and it is desirable to provide a uniform flow rate in which the concentration of peroxyacetic acid can be sampled, the fluid flowing in the second line 116 passes though a second flow meter for sensing the fluid flow through the second line 116, then though a first, proportional valve 120 for controlling the fluid flow in the second line, and subsequently to a drain 180 for discharging fluid flow from the device 100. A signal provided over the first flow control line from the first flow meter 112 and a signal provided over a second flow control line 115 from the second flow meter 118 are compared by a flow controller 126, which is programmed to adjust the first valve 120 such that the fluid flow though the third line 122 is maintained at a predetermined rate, such as, for example, 0.3 gal./min (1.14 liters/minute). Fluid flowing in the third line then preferably passes through a filter 124 such as a mesh screen to strain out residual large particles. The fluid flowing in the third line 122 then passes though a second valve 128 for controlling fluid flow in the third line 122 for a purpose to be described below.

The chiller water flowing in the third line 122 discharges to a mixing tank 130 for receiving fluid flow from the third line 122 for the purpose of adjusting the pH of the chiller water if necessary in order that the concentration of peroxyacetic acid be accurately assessed. The mixing tank 130 is provided with a mixer or stirrer 132 as well as a vent 134.

The chiller water including the peroxyacetic acid can have a pH on the alkaline side. However, sensors for peroxyacetic acid typically have a limited pH operating range, such as from about 1 to 9. Thus, if the chiller water is more alkaline than the operating range of the PAA sensor being employed, the PAA measurement drops to zero.

Thus, a first sensing device 140 for monitoring the pH of fluid in the mixing tank 130 is provided. The first sensing device 140 generates a signal responsive to the pH of the fluid in the mixing tank 130. The signal is applied through a first pH control line 141 to a first metering device or pump 144. An acid storage tank 142 is provided in fluid communication with the mixing tank 130 through the first metering device 144, which controls fluid flow from the acid storage tank 142 to the mixing tank 130. The first metering device 144 feeds acid from the acid storage tank 142 when the pH of the contents of the mixing tank 130 rise above a predetermined level, such as a pH of 8, for the purpose of lowering the pH of the contents to a level within the working range of the PAA sensor to be employed. The fluid in the mixing tank 130 is preferably maintained at a constant level 150. Should that level be exceeded, an overflow line 176 is provided for discharging the overflow from the mixing tank 130 to a drain 180.

A fourth line 152 is provided for discharging fluid from the mixing tank 130. A second pH sensing device 154 monitors the pH of fluid flowing in the fourth line 152. If the pH of the fluid in the fourth line 152 exceeds a predetermined pH, such as a pH of 8, the second pH sensing device 154 generates signals which are transmitted over a second pH control line 155 and a third pH control line 157, such that the fluid is discharged through a fifth line 156 in fluid communication with the fourth line 152 and a third valve 158 for controlling fluid flow through the fifth line 156 to discharge fluid from the mixing tank 130 to a drain 180. In addition, a sixth line 160 in fluid communication with the fourth line 152 is also provided, as well as a fourth valve 162 for controlling fluid flow through the sixth line 160.

Depending on the sensed pH, the second sensing device 154 generates a signal which is applied over the second pH control line 155 for controlling operation of the third valve 158 and a signal applied over the third pH control line 157 for controlling operation of the fourth valve 162. If the pH is above a predetermined value, the third valve 158 is opened and the fourth valve 162 is closed so that the chiller water is discharged to the drain 180. If the pH is below a predetermined value, the third valve 158 is closed, and the fourth valve 162 is opened to permit the chiller water to flow through the sixth line 160.

A first PAA sensing device 164 is provided, and preferably a second PPA sensing device 190, for sensing the concentration of peroxyacetic acid in fluid flowing in the sixth line 160. The first PAA sensing device 164 has a predetermined operating range, and provides a PAA concentration signal in response to the concentration of sensed concentration of peroxyacetic acid over a PAA signal line 165. The PAA concentration signal is employed to adjust the concentration of PAA in the chiller 300 as described below. Preferably, signals from the two PAA sensors 164, 190 are compared, and if the two signals differ by more than a predetermined amount, indicating malfunction, one or both PAA can be replaced.

Preferably, the device 100 further includes a seventh line 170 for providing fluid flow, such as cleaning water, to the third line 122. The fluid flow through the seventh line is controlled by a fifth valve 172. The seventh line 170 is in fluid communication with the third line 122 between the diverter 114 and the second valve 128. In order to clean the filter 124, fluid flow from the chiller 300 is stopped, the second valve 128 is closed, and the first valve 120 is opened so that cleaning water can flow through the filter 124 and out the second line 116 to the drain 180. Further, if desired, the second valve 128 can be opened so that cleaning water can flow through the mixing tank 130 and then to the fourth line 152. A fifth line 156 is provided in fluid communication with the fourth line 152, with flow through the fifth line 156 being controlled by a seventh valve 168. If the third valve 158 and the fourth valve 162 are closed, and the seventh valve 168 is opened, cleaning water can flow from the fourth line 152 and can flow out the fifth line 156 to be discharged from the device 100 to a drain 180. Similarly, an eighth line 174 in fluid communication with the sixth line 160 between the fourth valve 162 and the first PAA sensor 164 is provided. The eighth line 174 is controlled by a sixth valve 178. In order to clean the PAA sensors 164, 190 in the sixth line 160, the fourth valve 162 can be closed, and the sixth valve 178 can be opened in order to permit cleaning water to flow through the eighth line 174, the sixth line 160 and the PAA sensors 164, 190.

The present invention also provides a system for controlling the concentration of peroxyacetic acid in the contents of a chiller 300. The system includes the device 100, a PAA control system 400 which includes a PAA controller 410 a source of peroxyacetic acid, such as a PAA storage tank 402 containing an equilibrium solution of PAA, a first PAA delivery line 404 for fluid communication between the tank 402, and a PAA metering pump 406 for delivering peroxyacetic acid to the chiller 300 through a second PAA delivery line 408, and a controller 410 for the metering pump. The controller for the metering pump is preferably controlled by a signal from the first PAA sensing device 164.

The system of the present invention also provides a unit 200 for controlling the pH of the contents of the chiller 300. The unit 200 includes a pH sample delivery line 206 in fluid communication with the chiller 300 for delivering a sample of the chiller contents to a pH control sensing device 208 for sensing the pH of fluid in the delivery line 206, and a pH sample flow meter 210 for sensing the rate of flow of fluid in the delivery line 206. Recirculating pump 304 draws fluid through a recirculating line 302 from the chiller 300 and pumps the fluid back to the chiller 300 through a recirculating line 306, thus providing in a closed recirculating path relative to the chiller 300. Delivery line 206 is in fluid communication through valve 204 and line 202 with recirculating line 306, and thus the chiller 300. Preferably, the fluid output from a pH sample discharge line 212 is input to the first line 110 of the device 100 of the present invention. An alkali storage tank 222 is employed for storing an alkaline fluid. The alkaline fluid, such as an aqueous solution of sodium hydroxide, is transferred to an alkali feed or metering pump 226 over a first alkali delivery line 224. An alkali pump controller 230 controls the operation of the alkali metering pump 226 for delivering the alkaline fluid over to the chiller 300 over a second alkali delivery line 228. The alkali controller 230 receives a signal from the pH control unit device 200 and activating the alkali feed pump 230 when the signal from the pH control unit 200 meets a predetermined condition, such as when the pH of the chiller contents drops below a predetermined level.

The source of peroxyacetic acid can provide an equilibrium solution of peroxyacetic acid. Equilibrium solutions of peroxyacetic acid can be prepared remotely from the processing plant employing the chiller, and stored until needed. Conversely, the source of peroxyacetic acid can be a device which generated peroxyacetic acid in situ and provides nonequilibrium peroxcyacetic acid.

The chiller water sampling device 100 is employed to control the concentration of peroxyacetic acid in a chiller 300. A continuous sample of aqueous alkaline fluid from the chiller 300 is provided to the first line 110 of the device 100. For example, the sample can be delivered by the pH sample discharge line 212 of the pH control unit 200. The first valve 120 is controlled to provide a predetermined constant flow rate of the sample to the mixing tank 130, such as 0.3 gallons/minute (1.14 liters/minute). The aqueous fluid in the mixing tank 130 is mixed, preferably continuously using a mechanical stirring device or mixer 132. The pH of the aqueous fluid in the mixing tank 130 is monitored with the first sensing device 140, and if the pH of the aqueous fluid exceeds a predetermined value, the acid addition flow controller 126 causes acid stored in the acid storage tank 142 to be added by the first metering device 144 to the aqueous fluid in the mixing tank 130 to reduce the pH of the aqueous fluid in the mixing tank 130. Since peroxyacetic acid sensors have a limited range of pH in which they can operate accurately, and because the pH of aqueous fluid in the chiller may exceed the operating range of the peroxyacetic acid sensor, the pH of a sample of aqueous fluid from the chiller 300 must be reduced to within the operating range of the peroxyacetic acid sensor in order to accurately assess the level of peroxyacetic acid in the chiller 300. In order to protect the peroxyacetic acid devices 164, 190, the pH of the aqueous fluid leaving the mixing tank 130 in the fourth line 152 is monitored by the second sensing device 154. If the pH of the sample has been sufficiently reduced, the third valve 158 is closed and the fourth valve 162 is opened, and the aqueous fluid sample in the fourth line 152 is delivered to the sixth line 160 when the monitored pH of the aqueous fluid in the fourth line is within the working range of the PAA sensing devices 164, 190. The measured level of peroxyacetic acid in the sample is then used to control the addition of peroxyacetic acid to the chiller 300. A PAA control signal is generated by the PAA sensing device 164, and peroxyacetic acid is delivered to the chiller 300 in response to the signal from the first PAA sensing device.

Preferably, the second PAA sensing device is provided for sensing the concentration of peroxyacetic acid in the sixth line 160. The second PAA sensing device 190 provides a second signal in response to the concentration of sensed concentration of peroxyacetic acid signal. The signals from the first PAA sensing device 164 and the second PAA sensing device 190 can be compared. If the PAA levels measured by the two devices differ by greater than a predetermined amount, indicating a defective or damaged sensor, that sensor can be replaced.

Various modifications can be made in the details of the various embodiments of the apparatus and method of the present invention, all within the scope and spirit of the invention as defined by the appended claims

The invention claimed is:

1. A chiller water sampling device, the device including:
   a first line configured to enable a flow of discharged fluid from a chiller;
   a first flow meter for sensing fluid flow through the first line;
   a diverter in fluid communication with the first line for dividing the fluid flow from the first line into a second line and a third line;
   a second flow meter for sensing fluid flow through the second line;
   a first valve for controlling fluid flow through the second line;
   the second line discharging fluid flow from the device;
   a second valve for controlling fluid flow through the third line;
   a mixing tank for receiving fluid flow from the third line;
   an acid storage tank in fluid communication with the mixing tank;
   a first metering device for controlling fluid flow from the acid storage tank to the mixing tank;
   a pH sensing device for monitoring the pH of fluid in the mixing tank, the pH sensing device controlling fluid flow from the acid storage tank to the mixing tank;
   a fourth line for discharging fluid from the mixing tank;
   a fifth line in fluid communication with the fourth line for discharging fluid from the device;
   a third valve for controlling fluid flow through the fourth line;
   a sixth line in fluid communication with the fourth line for discharging fluid from the device;
   a fourth valve for controlling fluid flow through the sixth line;
   the pH sensing device controlling operation of the fourth valve and a third signal for controlling operation of the third valve such that when the pH sensed by the pH sensing device is above a predetermined value, the third valve is open and the fourth valve is closed, and when the pH sensed by the pH sensing device is below the predetermined value, the third valve is closed and the fourth valve is opened; and
   a first PAA sensing device for sensing the concentration of peroxyacetic acid in fluid flowing in the sixth line, the first PAA sensing device having an operating range, and providing a signal in response to the concentration of sensed concentration of peroxyacetic acid.

2. A device according to claim 1 further comprising a filter in the third line for filtering non-fluid material from the fluid flowing from the diverter to the second valve.

3. A device according to claim 2 further comprising a seventh line for providing fluid flow to the third line, fluid flow through the seventh line being controlled by a fifth valve, the seventh line being in fluid communication with the third line between the diverter and the second valve.

4. A device according to claim 1 further comprising an overflow line, the overflow line being in fluid communication with the mixing tank for discharging fluid from the device, the overflow line being positioned to discharge fluid from the mixing tank above a predetermined fluid level in the mixing tank.

5. A device according to claim 1 further comprising a second PAA sensing device for sensing the concentration of peroxyacetic acid in the sixth line.

6. A device according to claim 1 further comprising an eighth line for providing fluid flow to the sixth line, the fluid flow in the eighth line being controlled by a sixth valve, the eighth line being in fluid communication with the sixth line between the fourth valve and the first PAA sensing device.

7. A device according to claim 1 wherein the first flow meter generates a first flow control signal, the second flow meter generates a second flow control signal, and the first valve is a proportional valve, the device further including a controller for comparing the first signal and the second signal, and generating a control signal for the proportional valve, such that the flow through the third line is maintained at a predetermined flow rate.

8. A system for controlling the concentration of peroxyacetic acid in the contents of a chiller, the system comprising a device according to claim 1 arranged to receive fluid discharged from a chiller, a source of peroxyacetic acid, a metering pump for delivering peroxyacetic acid from the source of peroxyacetic acid to the chiller, and a controller for the metering pump, the controller for the metering pump being controlled by a signal from the first PAA sensing device.

9. A system according to claim 8 further comprising a unit for controlling the pH of the contents of the chiller, the unit comprising a pH sample delivery line in fluid communication with the chiller for delivering fluid from the chiller, a pH sensing device for sensing the pH of fluid in the pH sample delivery line, and a flow meter for sensing the rate of flow of fluid in the delivery line.

10. A system according to claim 9 wherein the delivery line is in fluid communication with the first line of the device.

11. A system according to claim 9 further comprising an alkali storage tank for storing an alkaline fluid, an alkali controller, and an alkali feed pump for delivering the alkaline fluid to the chiller, the alkali controller receiving a signal from the pH sensing device which senses the pH of the fluid in the pH sample delivery line, and activating the alkali feed pump when the signal from the pH sensing device meets a predetermined condition.

12. A system according to claim 8 wherein the source of peroxyacetic acid comprises a tank containing equilibrium peroxyacetic acid.

13. A system according to claim 8 wherein the source of peroxyacetic acid comprises a device for generating non-equilibrium peroxyacetic acid.

14. A process for controlling the concentration of peroxyacetic acid in a chiller employing a device according to claim 1, the process comprising:
provide a continuous sample of aqueous alkaline fluid from a chiller to the first line,
controlling the first valve to provide a predetermined constant flow rate of the sample to the mixing tank;
mixing the aqueous fluid provided to the mixing tank;
monitoring the pH of the aqueous fluid in the mixing tank, and adding acid to the aqueous fluid in the mixing tank to reduce the pH of the aqueous fluid in the mixing tank;
delivering aqueous fluid in the fourth line to the sixth line when the monitored pH of the aqueous fluid is within the working range of the first PAA sensing device; and
delivering peroxyacetic acid to the chiller in response to the signal from the first PAA sensing device.

15. A process according to claim 14, further comprising providing a second PAA sensing device for sensing the concentration of peroxyacetic acid in the sixth line, the second sensing device providing a second signal in response to the sensed concentration of peroxyacetic acid signal, and comparing the signals of the first and second PAA sensing devices.

\* \* \* \* \*

UNITED STATES PATENT AND TRADEMARK OFFICE
CERTIFICATE OF CORRECTION

PATENT NO. : 11,897,798 B2
APPLICATION NO. : 17/531935
DATED : February 13, 2024
INVENTOR(S) : Robert Larose It is certified that error appears in the above-identified patent and that said Letters Patent is hereby corrected as shown below:

In the Claims

Column 8, Line 31, Claim 7, change "the third line" to -- the second line --

Signed and Sealed this
Twenty-sixth Day of March, 2024

*Katherine Kelly Vidal*

Katherine Kelly Vidal
*Director of the United States Patent and Trademark Office*